US008658036B2

(12) United States Patent
Yoden et al.

(10) Patent No.: US 8,658,036 B2
(45) Date of Patent: Feb. 25, 2014

(54) COMPOSITE FILTRATION AND DEMINERALIZATION APPARATUS

(75) Inventors: Mitsuru Yoden, Tokyo (JP); Satoshi Kasahara, Tokyo (JP); Mikio Sugano, Tokyo (JP)

(73) Assignee: Organo Corporation, Tokyo (JP)

( * ) Notice: Subject to any disclaimer, the term of this patent is extended or adjusted under 35 U.S.C. 154(b) by 302 days.

(21) Appl. No.: 13/057,270

(22) PCT Filed: Jul. 28, 2009

(86) PCT No.: PCT/JP2009/063381
§ 371 (c)(1),
(2), (4) Date: Feb. 2, 2011

(87) PCT Pub. No.: WO2010/016410
PCT Pub. Date: Feb. 11, 2010

(65) Prior Publication Data
US 2011/0132827 A1 Jun. 9, 2011

(30) Foreign Application Priority Data
Aug. 8, 2008 (JP) .................................. 2008-205728

(51) Int. Cl.
| B01D 24/12 | (2006.01) |
| B01D 24/36 | (2006.01) |
| B01D 29/33 | (2006.01) |
| B01D 29/52 | (2006.01) |
| B01D 29/66 | (2006.01) |
| B01J 49/00 | (2006.01) |

(52) U.S. Cl.
USPC ........... 210/266; 210/269; 210/274; 210/275; 210/288; 210/289; 210/315; 210/317; 210/411

(58) Field of Classification Search
USPC ......... 210/266, 269, 274, 275, 288, 289, 315, 210/317, 342, 411
See application file for complete search history.

(56) References Cited

U.S. PATENT DOCUMENTS 1,677,891 A * 7/1928 Green ............................ 210/281
5,536,403 A * 7/1996 Sugimoto ...................... 210/256

FOREIGN PATENT DOCUMENTS

| JP | 57-071688 A | 5/1982 |
| JP | 58-034040 A | 2/1983 |

(Continued)

OTHER PUBLICATIONS

Extended European Search Report issued Jul. 12, 2012 in corresponding Application No. 09804894.5.

*Primary Examiner* — Matthew O Savage
(74) *Attorney, Agent, or Firm* — Knobbe Martens Olson & Bear LLP (57) ABSTRACT

A filtration and demineralization apparatus 10 including a vessel 20 in a form of a body of revolution; a hollow columnar body 40 that is located in an internal space of the vessel 20, one end 40a of the columnar body being connected to an inner surface of the vessel 20 along an entire circumference of the end, and the other end 40b of the columnar body forming an opening; and a partition plate 44 that is connected to the other end 40b of the hollow columnar body along an entire circumference of the other end 40b, the partition plate being configured to separate an inside space or an outside space of the hollow columnar body 40 as an independent space in the vessel. The partition plate 44 has a circulation port 43 that allows water that is to be treated to pass therethrough. The independent space in the vessel that is separated by the partition plate functions as a filtration chamber 41 in which filter elements are loaded, and the inside space or the outside space of the hollow columnar body that is not separated as the independent space by the partition plate functions as a demineralization chamber 22, the water that was treated in the filtration chamber being adapted to enter the demineralization chamber through the circulation port 43.

10 Claims, 4 Drawing Sheets

(56) References Cited

FOREIGN PATENT DOCUMENTS

| | | |
|---|---|---|
| JP | 59-052577 A | 3/1984 |
| JP | 62-083003 A | 4/1987 |
| JP | 63-190631 A | 8/1988 |
| JP | 06-170363 A | 6/1994 |
| JP | 08-117746 A | 5/1996 |
| JP | 10-080683 A | 3/1998 |
| JP | 2003-062561 A | 3/2003 |
| JP | 2008-155203 A | 7/2008 |

* cited by examiner

COMPOSITE FILTRATION AND DEMINERALIZATION APPARATUS

This application is the U.S. National Phase under 35. U.S.C. §371 of International Application PCT/JP2009/063381, filed Jul. 28, 2009, which claims priority to Japanese Patent Application No. 2008-205728, filed Aug. 8, 2008. The International Application was published under PCT Article 21(2) in a language other than English.

TECHNICAL FIELD

The present invention relates to a composite filtration and demineralization apparatus that is installed in a condensate treatment system of a thermal power plant or a nuclear power plant.

BACKGROUND ART

At a thermal power plant or a nuclear power plant, feed water is converted into steam by a steam generator, and a turbine is driven by the steam in order to generate electric power. The steam used for driving the turbine is condensed by a condenser, then passes through a condensate treatment system for water treatment, and is fed back to the steam generator as feed water. The condensate treatment system used in a thermal power plant or in a nuclear power plant is required to be capable of processing a large amount of condensate, to be capable of stably ensuring water quality that is required for a power generating facility by removing soluble impurities (ionic impurities) and suspended impurities (clads) from the condensate, and to be capable of preventing ion components or foreign objects, which are included in seawater or lake water that is used as cooling water in a condenser, from entering the power generating system even when there is leakage of the seawater or the lake water.

Generally, a condensate treatment system includes a filtration apparatus that removes suspended impurities from condensate and a demineralization apparatus that removes ionic impurities. The demineralization apparatus is installed separately from and downstream of the filtration apparatus and holds cation exchange resin and anion exchange resin that are charged therein in a mixed-bed form. Only a demineralization apparatus, or a composite filtration and demineralization apparatus, in which filter elements are pre-coated with powdered ion exchanging resin, may be installed. Recently, a filtration apparatus and a demineralization apparatus are often installed separately in order to provide highly purified condensate water.

In a demineralization apparatus, ion exchangers that are charged in the apparatus are backwashed in order to stably obtain highly purified treated water. Alternatively, when the ion exchanging capacity of ion exchangers are saturated, the ion exchangers are removed from the demineralization apparatus and are re-charged in the demineralization apparatus after being regenerated by means of chemical reagents. The ion exchangers may be backwashed after they are removed from the demineralization apparatus. After the ion exchangers are backwashed or regenerated, the ion exchangers should be mixed by means of water or air when they are re-charged in the demineralization apparatus or while they are being backwashed, so that the cation exchange resin and the anion exchange resin, which are separated from each other due to a difference in specific gravity, are brought to a mixed state. The demineralization apparatus is then filled with filling water, such as condensate or pure water that is separately supplied. A circulation operation is then performed so that the ion exchangers adsorb or fix a small amount of regenerants that remains in the demineralization apparatus and fine particles that are generated when the ion exchangers are backwashed or transferred. The circulation operation is performed by circulating the filling water through the demineralization apparatus after the apparatus is filled with the filling water, then by using a re-circulating pump to pressurize the circulating water that is discharged from the demineralization apparatus, and then by feeding back the circulating water to a point downstream of the filtration apparatus or upstream of the demineralization apparatus. When the system requires degassed water, a degassing operation may be performed prior to the circulation step by replacing the filling water in the demineralization apparatus with condensate (degassed by the condenser). This circulating operation prevents the remaining regenrerants or the fine particles from leaking into the condensate, allowing the demineralization apparatus to generate highly purified treated water immediately after it receives water that is to be treated.

When the filtration apparatus and the demineralization apparatus are installed separately, each apparatus individually requires components, such as a tank, a pump, valves, lines and a control board. It is also necessary to individually supply makeup water, compressed air used as service air and instrumentation air and so on, which are required for operating the apparatus. This causes a problem that a large amount of space is needed in order to install the filtration apparatus and the demineralization apparatus, and accordingly this causes a problem that the building cost and the cost of the apparatus increases. To deal with the problems, a report was made regarding a filtration and demineralization apparatus that includes a hollow fiber membrane, wherein the hollow portion of the membrane is filled with ion exchanging resin (e.g., Patent Document 1). Another filtration and demineralization apparatus has a column that houses a hollow fiber membrane module, as well as ion exchangers (e.g., Patent Document 2). There is a report on a composite filtration and demineralization apparatus in which a filtration apparatus and a demineralization apparatus are integrated (e.g., Patent Document 3) in one vessel. The inside of the vessel is divided into an upper chamber that houses hollow fiber membrane modules and a lower chamber that is filled with ion exchangers.

Patent Document 1: JP 06-170363A
Patent Document 2: JP 62-83003A
Patent Document 3: JP 08-117746A

DISCLOSURE OF THE INVENTION

Problem to be Solved by the Invention

However, the filtration and demineralization apparatuses disclosed in Patent Documents 1 and 2 are not practical because the operations of charging, removing and regenerating ion exchanging resin are burdensome. The composite filtration and demineralization apparatus disclosed in Patent Document 3 has a large height and requires a tall building designed to house the apparatus with such a large height. As a result, the building cost is increased. Further, if there is a limitation on the floor height, it is impossible to ensure sufficient capacity to treat given amount of condensate.

It is an object of the present invention to provide a filtration and demineralization apparatus that is capable of reducing the cost of the apparatus and building cost by using an apparatus whose height is limited, and that is also capable of ensuring sufficient treatment capacity, as well as good operability.

Means for Solving the Problems

According to the present invention, a filtration and demineralization apparatus comprises a vessel in a form of a body of revolution; a hollow columnar body that is located in an internal space of the vessel, one end of the columnar body being connected to an inner surface of the vessel along an entire circumference of the end, and the other end of the columnar body forming an opening; and a partition plate that is connected to the other end of the hollow columnar body along an entire circumference of the other end, the partition plate being configured to separate an inside space or an outside space of the hollow columnar body as an independent space in the vessel. The partition plate has a circulation port that allows water that is to be treated to pass therethrough. The independent space in the vessel that is separated by the partition plate functions as a filtration chamber in which filter elements are loaded, and the inside space or the outside space of the hollow columnar body that is not separated as the independent space by the partition plate functions as a demineralization chamber, the water that was treated in the filtration chamber being adapted to enter the demineralization chamber through the circulation port.

In the filtration and demineralization apparatus thus configured, the filtration chamber and the demineralization chamber are arranged on the same horizontal plane in the inside space and the outside space (or in outside space and inside space) of the vessel, via the hollow columnar body. Thus, the height of the apparatus can be easily limited. The vessel requires the form of a body of revolution having a large thickness in order to be resistive to the pressure of the condensate. However, since the hollow columnar body that separates the filtration chamber and the demineralization chamber is substantially subject to nothing other than the differential pressure that is generated at the boundary of filter elements and the ion exchangers, the hollow columnar body can be formed as a thin structure, which contributes to reducing the amount of material. As a result, a reduction in the cost of the apparatus and building cost is achieved. It is also easy to ensure the required treatment capacity because the necessary height of the apparatus is reduced. Moreover, in the filtration and demineralization apparatus according to the present invention, conventional filter elements and the ion exchangers can be individually arranged in each space (in the filtration chamber and the demineralization chamber), similarly to the conventional apparatuses. Thus, maintenance work is not largely different from that required for a filtration apparatus and a demineralization apparatus that are individually installed.

Thus, according to the present invention, a filtration and demineralization apparatus that is capable of reducing the cost of the apparatus and building cost using an apparatus whose height is limited and that is also capable of ensuring sufficient treatment capacity, as well as good operability, can be provided.

BEST MODE FOR CARRYING OUT THE INVENTION

First Embodiment

Figure 1:
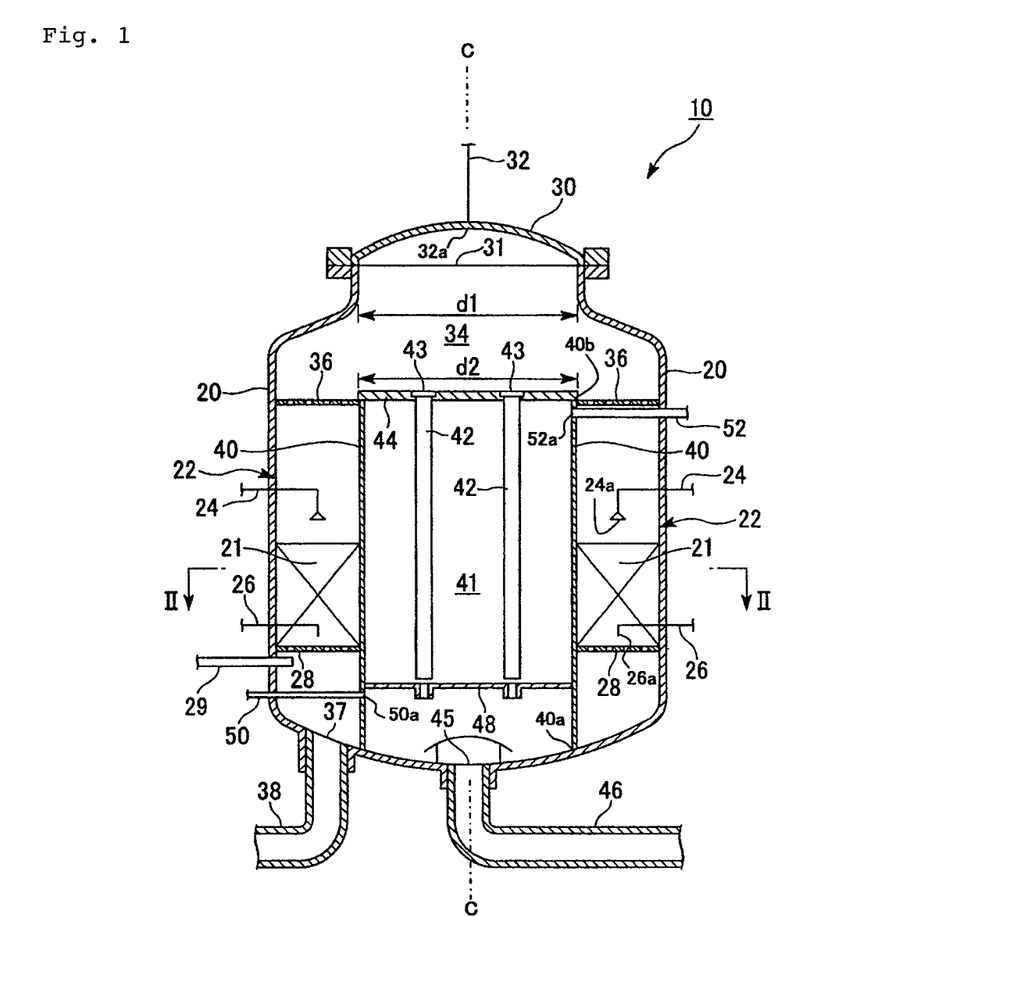
[FIG. 1] A longitudinal sectional view of a composite filtration and demineralization apparatus according to a first embodiment of the present invention.
Figure 2:
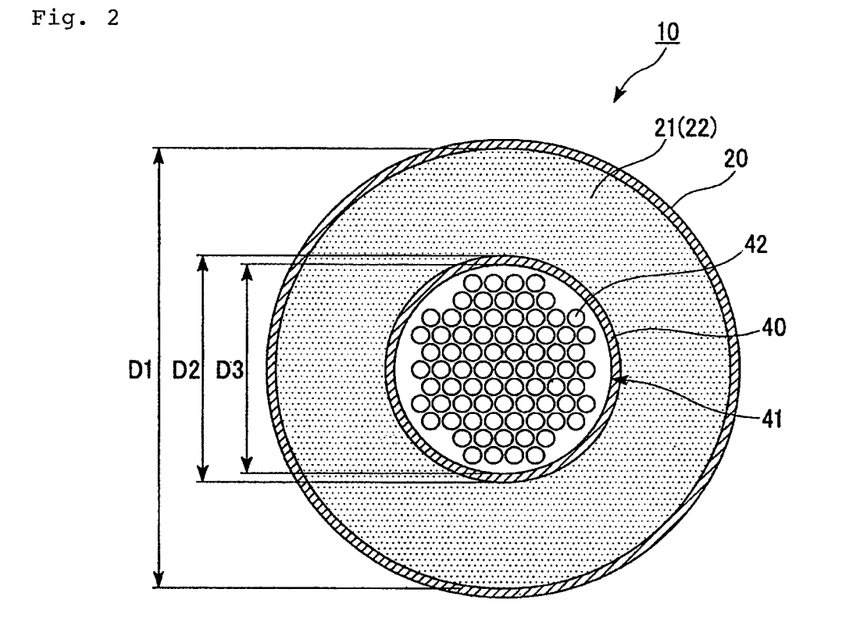
[FIG. 2] A transverse sectional view of the composite filtration and demineralization apparatus according to the first embodiment of the present invention.
Figure 3:
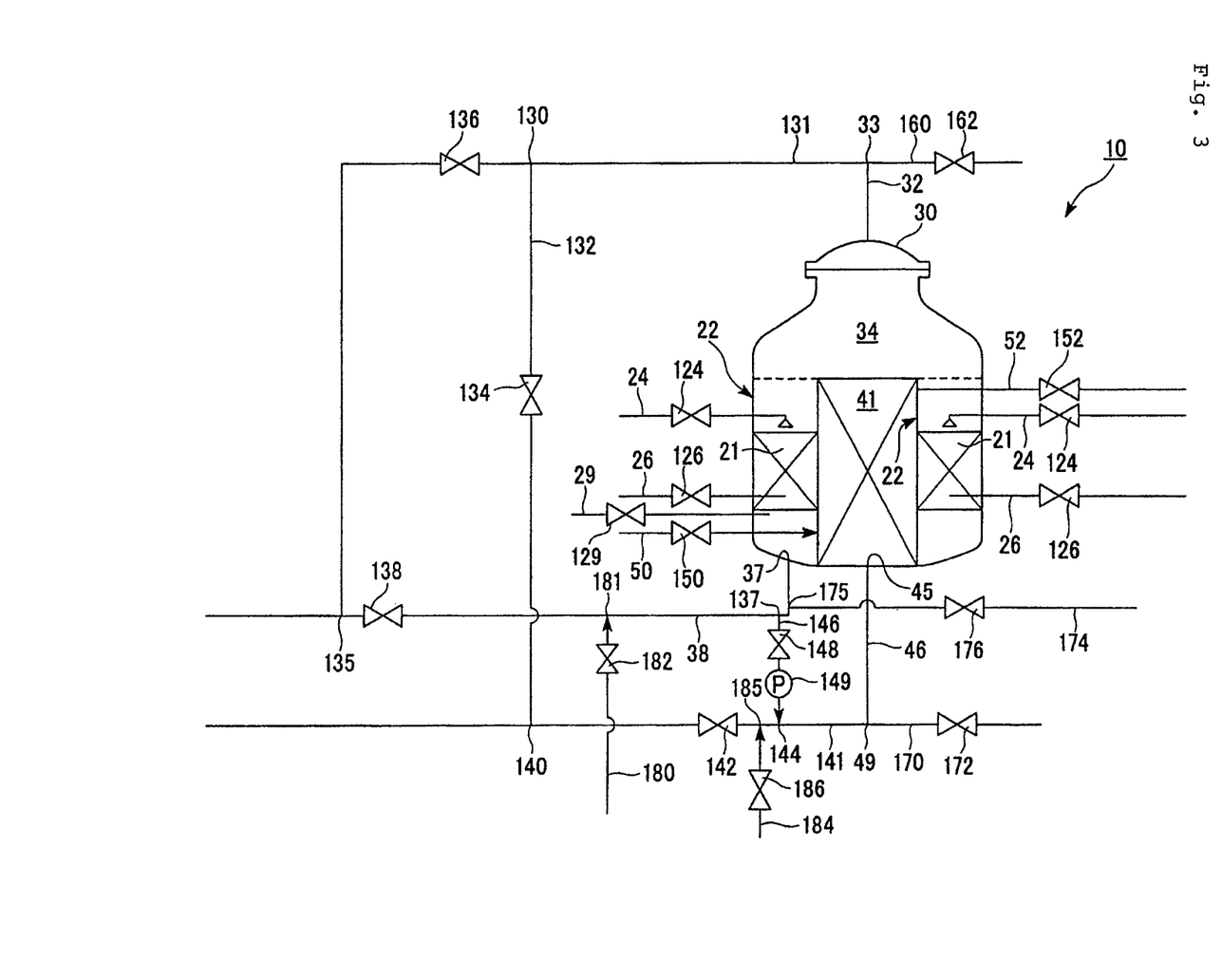
[FIG. 3] An explanatory piping diagram showing an exemplary water treatment method in the composite filtration and demineralization apparatus according to the first embodiment of the present invention.

Referring to FIGS. 1 to 3, a composite filtration and demineralization apparatus according to a first embodiment of the present invention is described. FIG. 1 is a longitudinal sectional view of composite filtration and demineralization apparatus 10 according to the first embodiment. FIG. 2 is a sectional view taken along line II-II in FIG. 1. FIG. 3 is an explanatory schematic diagram showing a water treatment method in composite filtration and demineralization apparatus 10.

As shown in FIGS. 1 and 2, composite filtration and demineralization apparatus 10 is provided with substantially cylindrical vessel 20 in the form of a body of revolution, substantially cylindrical hollow columnar body 40 and cover plate 30 that can be opened and closed and that is attached to vessel 20. Cover plate 30 enables charging and removing of the filter elements. Hollow columnar body 40 extends in vessel 20 in parallel with center axis C-C of vessel 20. One end 40a of columnar body 40 is connected to the inner surface of the bottom portion of vessel 20 along the entire circumference of end 40a, and the other end 40b of the columnar body forms an opening. The other end 40b of the columnar body is covered with partition plate 44 that includes circulation ports 43 for water that is to be treated. Partition plate 44, together with hollow columnar body 40, separates inside space 41 of hollow columnar body 40 as independent space 41 in vessel 20. Inside space 41 of hollow columnar body 40, i.e., the independent space in vessel 20 that is separated by partition plate 44, functions as filtration chamber 41 in which filter elements are loaded. Outside space 22 of hollow columnar body 40, i.e., outside space 22 of hollow columnar body 40 that is not separated as independent space by partition plate 44, functions as demineralization chamber 22 in which the ion exchangers are charged. The water that was treated in filtration chamber 41 enters demineralization chamber 22 via circulation ports 43. Line 32 is connected to cover plate 30 of vessel 20.

Dispersion plate 48 is provided in the lower portion of columnar body 40, and partition plate 44 is provided in the upper portion of columnar body 40. Filtration chamber 41 is defined by columnar body 40, partition plate 44 and the bottom portion of vessel 20. Partition plate 44 includes outlets 43 that allow water that was filtered by filter elements 42 to enter space 34. Filter elements 42 are fixed to partition plate 44, with one end being connected to outlet 43. Filter elements 42, which are supported by partition plate 44, are loaded in filtration chamber 41 with a gap from dispersion plate 48. Circulation port 45 is formed in the bottom portion of vessel 20, the bottom portion being located in columnar body 40. Circulation port 45 is connected to line 46, which is a flow path that connects filtration chamber 41 with the outside of vessel 20. Line 50 for supplying air to filtration chamber 41 from the outside of vessel 20 is provided below dispersion plate 48. Line 52 is provided in the upper portion of filtration chamber 41 and below partition plate 44. Line 52 exhausts air in filtration chamber 41 to the outside of vessel 20 or supplies air to filtration chamber 41 from the outside of vessel 20.

Distribution plate 36 is provided between vessel 20 and columnar body 40 at a level that is below partition wall 44. Demineralization chamber 22 is defined by columnar body 40, vessel 20 and distribution plate 36. Support 28 is disposed in the lower portion of demineralization chamber 22, and layer 21 of the charged ion exchangers is formed on support 28. Lines 24 for supplying ion exchangers are provided below distribution plate 36 and above layer 21. Lines 26 for removing the ion exchangers in layer 21 are provided in the lower portion of layer 21 at a level that is above support 28. Circulation port 37 is formed in the bottom portion of vessel 20, the bottom portion being located outside columnar body 40. Line 38 is connected to circulation port 37 and serves as a flow path that connects demineralization chamber 22 with the outside of vessel 20. Line 29 that supplies air to demineralization chamber 22 from the outside of vessel 20 is provided below support 28.

Space 34 is provided above partition plate 44 and distribution plate 36 in vessel 20. Space 34 connects filtration chamber 41 with demineralization chamber 22 so as to allow water that has passed through filtration chamber 41 to enter demineralization chamber 22.

As shown in FIG. 3, line 46 is connected to line 141 and line 170 at connection 49. Valve 172 is provided on line 170, and line 170 is connected to a discharge port, not shown. Line 141 is connected to line 132 at connection 140. Line 141 is provided with valve 142 between connection 49 and connection 140. Line 141 is connected to line 184 at connection 185 that is located between connection 49 and valve 142. Line 184 is connected to a supply source of pure water (makeup water), not shown. Valve 186 is provided on line 184. Line 141 is connected to line 146 at connection 144 that is located between connection 49 and connection 185. Line 146 is connected to line 38 at connection 137. Line 38 is connected to a point of use, not shown. Line 146 is provided with valve 148 and pump 149.

Line 38 is connected to line 174 at connection 175 that is located between circulation port 37 and connection 137. Line 174 is connected to a discharge port, not shown. Valve 176 is provided on line 174. Line 38 is connected to line 131 at connection 135. Line 38 is provided with valve 138 that is located between connection 137 and connection 135. Line 38 is connected to line 180 at connection 181 that is located between connection 137 and valve 138. Line 180 is connected to a supply source of makeup water, not shown. Line 32 is connected to line 131 and line 160 at connection 33. Valve 162 is provided on line 160. Line 160 is connected to a discharge port, not shown. Line 131 is connected to line 132 at connection 130. Line 132 is connected to line 141 at connection 140. Line 131 is provided with valve 136 that is located between connection 130 and connection 135. Valve 134 is provided on line 132. Lines 24 and lines 26 are connected to a regeneration tank, not shown. Valves 124 are provided on lines 24. Valves 126 are provided on lines 26. Valve 129 is provided on line 29. Valve 150 is provided on line 50. Valve 152 is provided on line 52.

A means for backwashing the filter elements consists of dispersion plate 48 and lines 46, 50, 52. A means for backwashing the ion exchangers consists of space 34 and lines 29, 32, 38. A means for circulating water consists of space 34, lines 38, 46, 141, 146 and pump 149.

The ratio of inner diameter D3 of columnar body 40 to inner diameter D1 of vessel 20, shown in FIG. 2, may be determined by taking into consideration the quality of water that is to be treated, types of filter elements 42 and types of the ion exchangers in layer 21. For example, the ratio is preferably selected within a range of D3/D1=2/10 to 8/10, more preferably within a range of D3/D1=4/10 to 6/10. Within these ranges, removal of suspended impurities by filter elements 42 and demineralization by the ion exchangers are compatible and the water that is to be treated can be highly purified.

Filter element 42 may be a member that allows the filtered water to exit from the upper end thereof and may be of an external pressure type, such as a hollow fiber membrane module and a cylindrical pleated filter. In particular, the hollow fiber membrane module may be preferably used because it can efficiently treat a large volume of condensate with compact columnar body 40 due to the large filtering area. In one example, a casing having through-holes or slits thereon houses a bundle of a plurality of hollow fiber membranes whose both ends in the longitudinal direction are bound together, wherein one end of the casing is open, with the end openings of the hollow fibers being located at the open end of the casing, and wherein the hollow fibers are closed at the other end of the casing (a closed end of the casing). Such a hollow fiber membrane module is connected to and fixed to outlets 43 of partition plate 44 with the open end of the casing being an upper end.

In an additional example, a casing may house a bundle of hollow fiber membranes that are open at both ends, wherein one end of the membrane is connected to outlet 43 as an upper end and the other end is connected to a water collecting portion as a lower end, the water collecting portion being provided in the casing, and wherein a channel for connecting the water collecting portion with outlet 43 is formed in the casing. In such a hollow fiber membrane module, a part of filtered water that penetrated through the hollow fiber membranes and reached the holes exits from the upper end of the hollow fiber membrane bundle. In addition, another part of the filtered water that penetrated through the hollow fiber membranes and reached the holes exits from the lower end of the hollow fiber membrane bundle and enters the water collecting portion, then passes through the channel that connects the water collecting portion with outlet 43, and enters space 34 via outlet 43. In such a hollow fiber membrane module, the upper end is connected and fixed to outlet 43 of partition plate 44.

Similarly, when cylindrical pleated filters are used, the upper open ends of the cylindrical pleated filters are connected to outlets 43 so that the filters are fixed to partition plate 44. Thus, filter elements 42 are fixed to partition plate 44, with the filters being connected to outlets 43 at the side of the outlet of the filtered water, while the other ends of filter elements 42 are apart from dispersion plate 48.

Filter element 42, such as the hollow fiber membrane used in the hollow fiber membrane module, can be made of polyvinylidene fluoride (PVDF), polyacrylonitrile (PAN), polysulfone (PS) or polyethylene (PE).

The ion exchangers that are charged in layer 21 can be selected by taking into consideration the quality of the water that is to be treated. For example, ion exchanging resin, ion-exchange fiber or monolithic porous ion exchangers may be used. In particular, the ion exchanging resin is preferable because it is most common, excellent in ion removing efficiency and in ion exchanging capacity, and is easy to regenerate. Anion exchange resin and cation exchange resin may be used as the ion exchange resin. Strong base anion exchange resin or weak base anion exchange resin may be used as the anion exchange resin. Strongly acidic cation exchange resin or weakly acidic cation exchange resin may be used as the cation exchange resin. These resins may be used individually or in combination of two or more.

The manner in which the ion exchangers are charged can be determined by taking into consideration the quality of the water that is to be treated and the quality of water that is required as deionized water. Thus, the ion exchangers may be charged in any of the following ways; charging the anion exchangers in a single-bed, charging the cation exchangers in a single-bed, charging the anion exchangers and the cation exchangers in a mixed-bed or in multiple-bed. In particular, it is preferable to charge the anion exchangers and the cation exchangers in mixed-bed because cation components and anion components in the condensate, which are soluble impurities in the condensate, can be removed efficiently.

Support 28 is an annular member that has the same cross section as demineralization chamber 22 and that is formed between columnar body 40 and vessel 20, as shown in FIG. 2. Support 28 is configured to allow the water that flows in demineralization chamber 22 to pass therethrough and prevents the ion exchangers charged in layer 21 from leaking. Support 28 may be made, for example, of a resin or metal member having a plurality of through-holes or slits that are smaller than the particle size of the ion exchange resin when ion exchange resin is charged as the ion exchangers. Support 28 may be formed in the shape of a flat plate having a thickness that is constant from the outer circumferential edge to the inner circumferential edge, or may be formed in a concave shape in a section that connects the outer circumferential edge and the inner circumferential edge.

There are no particular limitations on distribution plate 36. For example, an annular member including a plurality of through-holes may be used.

There are no particular limitations on dispersion plate 48. For example, a member having the same number of through-holes as that of filter elements 42 may be used.

There are no particular limitations on inner diameter d1 of upper opening 31 of vessel 20, shown in FIG. 1. However, inner diameter d1 is preferably no less than diameter d2 of partition plate 44 because, if the relationship d1≥d2 is satisfied, filter elements 42 can be removed from columnar body 40 holding partition plate 44 and filter elements 42 together and filter elements 42 can be loaded in columnar body 40 holding partition plate 44 and filter elements 42 together.

Referring to FIGS. 1 and 3, a description is made about a method of cleaning condensate (cleaning step) using composite filtration and demineralization apparatus 10. First, valves 138 and 142 are opened, while valves 124, 126, 129, 134, 136, 148, 150, 152, 162, 172, 176, 182, 186 are closed in order to supply line 141 with water that is to be treated (condensate). The water that is to be treated is fed through line 141, 46 and supplied to filtration chamber 41 via circulation port 45. The water that was supplied passes through dispersion plate 48, then penetrates through the outer circumferential surfaces of filter elements 42 and reaches the hollow holes of filter elements 42. During the process, the suspended impurities that are not allowed to penetrate through filter elements 42 are mainly removed (filtering step). The water that reaches the hollow holes of filter elements 42 flows through the hollow holes and exits outlets 43 to enter space 34. The water that enters space 34 passes through distribution plate 36 to enter the space between columnar body 40 and vessel 20, and then flows through demineralization chamber 22. During the process, the water that was supplied flows through the ion exchangers in layer 21, while being dispersed, so that cation components and anion components, which are soluble impurities in the water that is to be treated, are mainly removed (demineralization step). The water, from which the suspended impurities have been sufficiently removed in the filtering step, and from which the soluble impurities have been sufficiently removed in the demineralization step, is fed to line 38 via circulation port 37, and then fed to a point of use, such as a steam generator.

Composite filtration and demineralization apparatus 10 may perform either the filtering step or the demineralization step. For this purpose, composite filtration and demineralization apparatus 10 is provided with inlet (circulation port) 45 at the bottom of vessel 20 and outlet 32a at the top of vessel 20, wherein inlet 45 supplies the water that is to be treated to filtration chamber 41 and outlet 32a discharges the water that was processed in filtration chamber 41 to the outside of vessel 20. For example, when only the filtering step is performed, the ion exchangers may be removed from demineralization chamber 22 and an operation similar to the above-mentioned cleaning step may be performed. Alternatively, the following step may be performed as the filtering step. Valves 136 and 142 are opened, while valves 124, 126, 129, 134, 138, 148, 150, 152, 162, 172, 176, 182, 186 are closed. Similar to the above-mentioned demineralization step, the water that is to be treated is supplied to filtration chamber 41 via circulation port 45. The water that was supplied passes through dispersion plate 48. The water that was filtered by penetrating through filter elements 42 flows through the hollow holes and exits from outlets 43 to enter space 34. The filtered water that enters space 34 passes through line 32, then through line 131 that merges with line 38 at connection 135, and is fed to the point of use. Thus, only the filtering step can be performed even when layer 21 is formed between columnar body 40 and vessel 20. In the step of only performing the filtering step, line 32 is used for discharging the water that passed through the filtration chamber to the outside of the vessel.

Similarly, when only the demineralization step is performed, an operation that is similar to the cleaning step may be performed with filter elements 42 not being loaded. Alternatively, the following step may be performed as the demineralization step. For this purpose, composite filtration and demineralization apparatus 10 is provided with inlet 32a at the top of vessel 20 and outlet (circulation port) 37 at the bottom portion of vessel 20, wherein inlet 32a supplies the water that is to be treated to demineralization chamber 22, and outlet 37 discharges the water that was treated in demineralization chamber 22 to the outside of vessel 20. Valves 134 and 138 are opened, while valves 124, 126, 129, 136, 142, 148, 150, 152, 162, 172, 176, 182, 186 are closed. The water that is to be treated passes through line 141, then through line 132 via connection 140. The water that is to be treated passes through line 132, then through lines 131, 32 via connection 130, and enters space 34. The water that enters space 34 passes through distribution plate 36 and flows through demineralization chamber 22. The water that flows through demineralization chamber 22 then passes through line 38 via circulation port 37, and is fed to the point of use. Thus, only the demineralization step can be performed even when filter elements 42 are loaded in filtration chamber 41. In the step performing only the demineralization step, line 32 is used for supplying water that flows through the demineralization chamber.

After the cleaning steps, the filtering step and the demineralization steps are repeated, suspended impurities adhere to the outer surfaces of filter elements 42. This causes a drop in permeability for the water that is to be treated, an increase in a differential pressure, and eventually a reduction in the filtering efficiency. In demineralization chamber 22, the ion exchanging capacity of the ion exchangers in layer 21 is saturated, and soluble impurities leak into the water that was treated. In such a case, backwashing of filter elements 42 and regeneration of the ion exchangers are performed. For this purpose, composite filtration and demineralization apparatus 10 is provided with air supply port 50a for backwashing filter elements 42, the port being located below filter elements 42 of filtration chamber 41, and air discharge port 52a for discharging the air that was supplied, the port being located in the upper portion of filtration chamber 41.

Referring to FIGS. 1 and 3, a method of backwashing filter elements 42 is described. First, valves 150 and 152 are opened, while valves 124, 126, 129, 134, 136, 138, 142, 148, 162, 172, 176, 182, 186 are closed. Air is supplied to filtration chamber 41 from line 50. Dispersion plate 49 generates air bubbles that are supplied to filtration chamber 41. The bubbles rise in filtration chamber 41 toward partition plate 44. The bubbles generate air-lifted upward flow in the water in filtration chamber 41. The air-lifted upward flow applies shear force on the outer circumferential surfaces of filter elements 42, thereby washes filter elements 42 by air scrubbing. The objects that are made of suspended impurities etc. and that stick to the outer circumferential surfaces of filter elements 42 are peeled off with the air-scrubbing washing and are dispersed in filtration chamber 41. The air that was discharged to filtration chamber 41 passes through line 52, and is discharged to the outside of vessel 20.

After performing the air scrubbing washing for any duration of time, valves 152 and 172 are opened, while valves 124, 126, 129, 134, 136, 138, 142, 148, 150, 162, 176, 182, 186 are closed. Air is supplied to filtration chamber 41 from line 52 so that the water in filtration chamber 41 is discharged to line 46 via circulation port 45. The water that was discharged passes through 46 and then line 170, and is discharged through the discharge port, not shown (filter elements backwash step). Thus, the suspended impurities are peeled off and removed from the outer circumferential surfaces of filter elements 42, so that the performance of filter elements 42 is recovered (filter elements backwash step).

Referring to FIGS. 1 and 3, a method of regenerating the ion exchangers is described. In order to regenerate the ion exchangers, composite filtration and demineralization apparatus 10 is provided with ion exchangers charging ports 24a above layer 21 of the ion exchangers in demineralization chamber 22 and ion exchangers discharge ports 26a in or below layer 21 of the ion exchangers. Valves 126, 124, 182 are opened, while valves 129, 134, 136, 138, 142, 148, 150, 152, 162, 172, 176, 186 are closed. Air is supplied from lines 24 to the space above layer 21 in demineralization chamber 22. Makeup water is supplied to line 180, then passes through line 38 via connection 181, and is supplied to demineralization chamber 22 via circulation port 37. In this way, the ion exchangers in layer 21 are transferred to the outside of vessel 20 through lines 26, while the makeup water and the air are being supplied. The transferred ion exchangers are conveyed to the regeneration tank, not shown. The conveyed ion exchangers are dipped into regenerants or are exposed to flowing regenerants solution, so that soluble impurities that are adsorbed in the ion exchangers are eluted (elution step). The regenerated ion exchangers are then washed with cleaning water in order to remove the regenerants (washing step). In the step of transferring the ion exchangers from the filtration and demineralization apparatus, lines 24 are used as a means for supplying air for transferring the ion exchangers.

After the ion exchangers were regenerated, valves 124, 162, 176 are opened, while valves 126, 129, 134, 136, 138, 142, 148, 150, 152, 172, 182, 186 are closed. The ion exchangers that were washed are charged on support 28 via lines 24, support 28 being provided in demineralization chamber 22. During the process, surplus water exits from circulation port 37, passes through line 38, then through line 174, and is discharged via the discharge port, not shown. Surplus air in vessel 20 passes through line 32, then through line 160, and is discharged (regeneration step). In this way, the ion exchangers are regenerated. In the step of charging the ion exchangers in the filtration and demineralization apparatus, lines 24 are used as a means for supplying the ion exchangers that were washed to the filtration and demineralization apparatus.

In order to remove the suspended impurities that stick to the surface of the ion exchangers, the ion exchangers may be backwashed. For this purpose, composite filtration and demineralization apparatus 10 is provided with air supply port 29a for backwashing the ion exchangers, the port being below layer 21 of the ion exchangers in demineralization chamber 22, and is provided with air discharge port 32a for discharging air that was supplied, the port being at the top of vessel 20. Valves 129 and 162 are opened, while valves 124, 126, 134, 136, 138, 142, 148, 150, 152, 172, 176, 182, 186 are closed. Air is supplied below support 28 of demineralization chamber 22 from line 29. Support 28 generates air bubbles, and the air rises in demineralization chamber 22. During the process, the ion exchangers in layer 21 are washed by air scrubbing that is caused by the air-lifted upward flow of the bubbles. The bubbles that rise in demineralization chamber 22 pass through distribution plate 36, reach space 34, pass through space 34, line 32 and line 160, and are discharged to the outside of vessel 20. Thus, the objects that stick to the surface of the ion exchangers are peeled off and are dispersed in the water in demineralization chamber 22.

After performing washing by air scrubbing for any specific duration of time, valves 162 and 182 are opened, while valves 124, 126, 129, 134, 136, 138, 142, 148, 150, 152, 172, 176, and 186 are closed. Makeup water is fed to line 180 and line 38. The makeup water is supplied to demineralization chamber 22 via circulation port 37. The makeup water that was supplied rises in demineralization chamber 22, while capturing the objects that were peeled off from the ion exchangers. The makeup water passes through distribution plate 36 to enter space 34, then passes through space 34, line 32 and line 160, and is then discharged from the discharge port, not shown (ion exchangers backwash step). In this way, the ion exchangers are backwashed.

When the backwashing or the regeneration is performed in the demineralization apparatus, as described above, fine particles are generated due to friction between particles of the ion exchangers that occur when the ion exchangers are transferred or mixed. The fine particles that are generated from the cation exchangers mainly consist of polystyrene sulfonate (PSS), which is a component that forms the cation exchangers. The PSS causes a problem of a reduction in reactivity of the anion exchangers, and when the PSS leaks from the demineralization apparatus into the power generating system, it causes another problem in which the sulfate concentration in the nuclear reactor or in the steam generator increases. Thus, before water is supplied to the demineralization apparatus, the PSS must be discharged to the outside of the system as much as possible. In order to discharge the PSS to the outside of the system, a large amount of water may be supplied and then drained to the outside of the system. However, this method generates a large amount of waste water, especially a large amount of radioactive waste in the case of a boiling water reactor, and the use of the draining operation for discharging the PSS tends to be limited. Further, the filling water is directly supplied to the demineralization apparatus as is, i.e., without removing soluble impurities or suspended impurities from the filling water. The filling water may often contain insoluble iron, which promotes deterioration of the cation exchangers. To remove the insoluble iron, a filtration apparatus dedicated for the filling water might be installed on the filling water supply line. However, this increases the cost of the apparatus and maintenance cost of the filtration apparatuses. Moreover, a slight amount of regenerants that was used for regeneration still remains. Thus, before the cleaning step is started, a circulating flushing step is performed in order to remove fine particles of the ion exchangers, as well as the remaining regenerants.

The circulating cleaning step is performed as follows. After performing the filter element backwash step, the regeneration step, or the ion exchangers backwash step, vessel 20 is filled with the filling water in order to remove air in filtration chamber 41 and in demineralization chamber 22. Valves 162 and 186 are opened, while valves 124, 126, 129, 134, 136, 138, 142, 148, 150, 152, 172, 176, 182 are closed. Makeup water is supplied to line 184 as the filling water. The filling water passes through line 184, then through line 46, and is supplied to filtration chamber 41 via circulation port 45. The filling water that enters filtration chamber 41 passes through dispersion plate 48 and flows through filtration chamber 41. The filling water penetrates through the outer circumferential surfaces of filter elements 42 and reaches the hollow holes of filter elements 42. During the process, the suspended impurities, such as insoluble iron, that are not allowed to penetrate through filter elements 42 are mainly removed. The filling water that reached the hollow holes of filter elements 42 flows through the hollow holes and exits outlets 43 to enter space 34. The filling water that entered space 34 passes through distribution plate 36 and fills demineralization chamber 22. During the process, a part of the filling water is removed via line 32, together with the air in vessel 20. Thus, vessel 20 is filled with the filling water that is free from the suspended impurities, such as insoluble iron, that are not removable by the ion exchangers (water-filling step).

Next, valve 148 is opened, while valves 124, 126, 129, 134, 136, 138, 142, 150, 152, 162, 172, 176, 182, 186 are closed. After vessel 20 is filled with the filling water in the water-filling step, pump 149 is started in order to circulate the filling water as circulating water. The water in demineralization chamber 22 exits circulation port 37 and passes through line 38, line 146, line 141 and line 46, and enters filtration chamber 41 via circulation port 45. The water that enters filtration chamber 41 flows through filtration chamber 41 while the suspended impurities are removed. The water then flows through space 34, passes through distribution plate 36 and reaches demineralization chamber 22. The water then flows in demineralization chamber 22 and is discharged to line 38 via circulation port 37. The water captures fine particles while flowing through demineralization chamber 22. The remaining regenerants in the ion exchangers in layer 21 flows with the circulating water while being repeatedly adsorbed in and eluted from the ion exchangers.

The water that captured the fine particles exits line 38, passes through line 146, line 141 and line 46, and enters filtration chamber 41 again via circulation port 45. The fine particles are removed when the water that contains the fine particles penetrates through filter elements 42 of filtration chamber 41. After the fine particles are removed by filter elements 42, the water passes through distribution plate 36 via space 34 and flows through demineralization chamber 22. During the process, the water captures the remaining regenerants in the ion exchangers in layer 21. The water is then discharged to line 38 via circulation port 37, passes through line 146, line 141 and line 46, and enters filtration chamber 41. Thus, by performing the circulation washing such that the water that passed through demineralization chamber 22 is circulated to filtration chamber 41, the fine particles that are generated in the ion exchangers are removed from the circulating water. Moreover, the regenerants that remain in the ion exchangers are gradually adsorbed by the ion exchangers and are then removed from the circulating water.

Time duration of the circulation washing step can be determined by taking into consideration the water quality required as condensate or the amount of the ion exchangers. For example, the circulation washing step may be accomplished when the measured quality of the circulating water satisfies any required condition. The quality of the circulating water may be established based on indices, for example, conductivity.

As described above, columnar body 40 is provided such that columnar body 40 partitions the inside space of vessel 20 into filtration chamber 41 in which filter elements 42 are loaded and demineralization chamber 2 in which the ion exchangers are charged such that both chambers are arranged on the same plane. This enables integrating the filtration apparatus and the demineralization apparatus, unifying the installing space of the filtration apparatus and the demineralization apparatus and reducing the size. Additionally, as compared with a conventional composite filtration and demineralization apparatus that is partitioned into the upper chamber for the filtration chamber and the lower chamber for the demineralization chamber by means of a partition wall, the composite filtration and demineralization apparatus 10 has a smaller height because columnar body 40 partitions the inside space of vessel 20 into filtration chamber 41 and demineralization chamber 22 such that both chambers are arranged on the same plane. As a result, the installation space of composite filtration and demineralization apparatus 10, especially the required height, can be reduced. Further, since the auxiliary equipment, such as pumps, valves and control boards, can be shared, building cost, as well as the cost of the apparatus, including investment in the apparatus and maintenance costs, can be saved.

In composite filtration and demineralization apparatus 10, the distance between the outer and the inner circumferential edges of support 28, i.e., the distance obtained by subtracting outer diameter D2 of columnar body 40 from inner diameter D1 of vessel 20, is smaller than inner diameter D1 of vessel 20, as shown in FIG. 2. Since support 28 is supported along the outer circumferential surface of columnar body 40 and the inner circumferential surface of vessel 20, support 28 ensures enough strength to support the ion exchangers even if it is formed in a flat plate shape. If support 28 is formed in a partial sphere or in a concave plate, the ion exchangers charged in the concave portion contributes little to the demineralizing effect. Thus, by forming support 28 in a flat plate shape,-manufacturing cost of support 28, as well as an amount of ion exchangers that is to be charged, is reduced, and thereby the cost of the apparatus can be reduced.

When the filtration apparatus and the demineralization are separately installed, as in the conventional case, the material for the vessel of each apparatus must be selected such that it is resistive to the system pressure (about 2.0 to 3.0 MPa) of the condensate system. When the vessel is partitioned into upper and lower chambers by means of a partition wall so that a filtration chamber is located in the upper chamber and a demineralization chamber is located in the lower chamber, the material both for the upper chamber and for the lower chamber must be selected such that it is resistive to the system pressure (about 2.0 to 3.0 MPa) of the condensate system. In composite filtration and demineralization apparatus 10 which has filtration chamber 41 inside columnar body 40, columnar body 40 may be made of a member that is resistive to differential pressure (about 0.3 MPa) that is required in the filtering step (or may be made of a member that is resistive to total differential pressure generated in the filtering and demineralization steps for the portion below layer 21 of the ion exchangers). Accordingly, the cost of composite filtration and demineralization apparatus 10 can be reduced.

In the case of a conventional demineralization apparatus that is independently installed, when water that is to be treated is supplied to the demineralization apparatus at a high flow velocity, variation on velocity distribution of the water occurs in the demineralization apparatus and reduces demineralizing efficiency. Composite filtration and demineralization apparatus 10 having the vessel formed in double structures allows the filtered water that passed through filtration chamber 41 to pass through demineralization chamber 22. Thus, the distance between the circumferential edge and the center of demineralization chamber 22, seen in a section, can be reduced, as shown in FIG. 2, as compared to the cylindrical demineralization chamber that allows water to flow therethrough. This allows the water to flow without causing variation on flow velocity distribution and ensures demineralizing efficiency.

As described above, line 32 facilitates performing only either the filtering step or the demineralization step for the water that is to be treated, depending on the purpose for which the water, that is treated, is to be used. This enables cleaning the water depending on the purpose of the point of use and also enables effective use of the filter elements or the ion exchangers.

As described above, by setting the inner diameter of opening 31 of vessel 20 to be no less than the diameter of partition plate 44, the loading and removing process of filter elements 42 is facilitated. As a result, maintenance period for filter elements 42 can be shortened, and the operating rate of composite filtration and demineralization apparatus 10 can be increased.

As described above, lines 24 and lines 26 facilitate removing and charging of the ion exchangers. By providing the means to backwash the ion exchangers, the ion exchangers can be backwashed while the ion exchangers are charged. As a result, the ion exchangers can be easily washed or regenerated at an appropriate interval.

As described above, by providing the means to backwash filter elements 42, filter elements 42 can be washed at an appropriate interval while it is loaded, and filtering efficiency can be ensured.

In the case of a conventional filtration apparatus and a demineralization apparatus that are separately installed, the circulating water is fed to the demineralization apparatus after the ion exchangers are backwashed or regenerated, so that the fine particles are fixed by the layer of the ion exchangers and the amount of microscopic particle that leaks is reduced. Alternatively, a large amount of washing water is fed to the demineralization apparatus in order to discharge the fine particles to the outside of the system. In contrast, according to the present invention, the circulating water flows through demineralization chamber 22 and then through filtration chamber 41. The fine particles that remain in layer 21 are captured by the circulating water, and the circulating water is then filtered in filtration chamber 41. The fine particles can thus be removed effectively. Accordingly, there is no need to use a large amount of washing water in order to discharge the fine particles to the outside of the system, and the amount of waste water necessary for preparing the cleaning step can be greatly reduced. Moreover, the filling water may contain impurities, such as insoluble iron. However, since the filling water is filtered in filtration chamber 41, water free from suspended impurities, such as insoluble iron, can be used as filling water without installing an additional filtration apparatus. Thus, the cost of the apparatus can be reduced.

Second Embodiment

Figure 4:
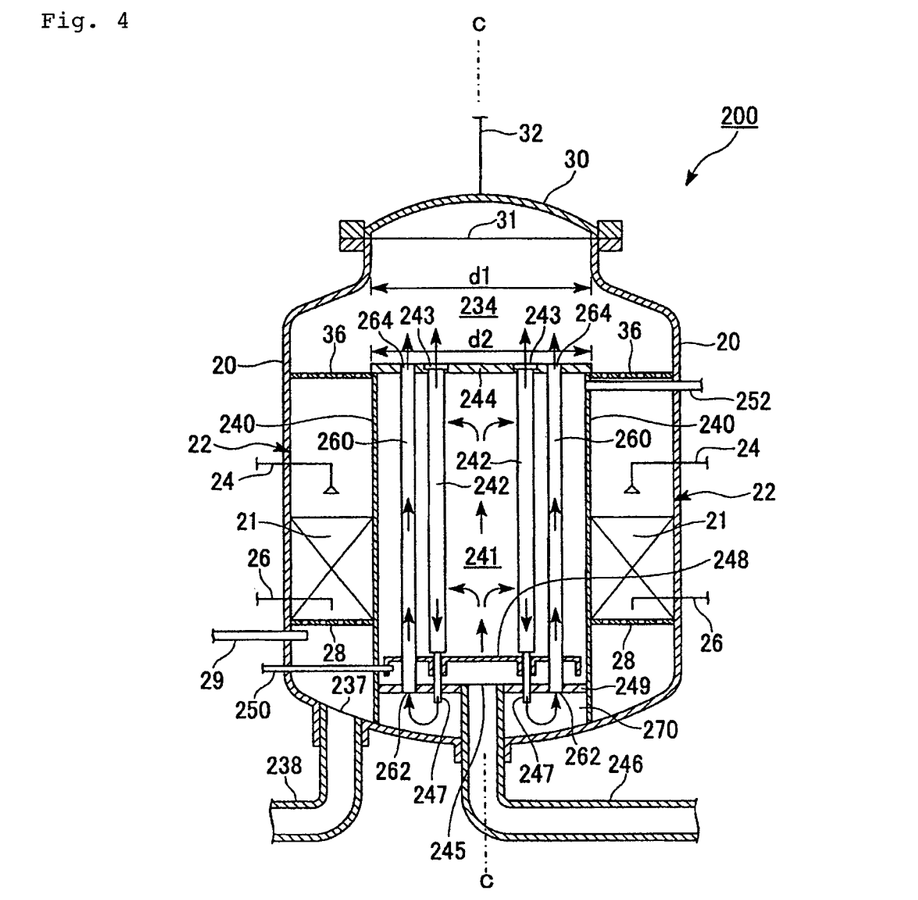
[FIG. 4] A longitudinal sectional view of a composite filtration and demineralization apparatus according to a second embodiment of the present invention.

Referring to FIG. 4, a composite filtration and demineralization apparatus according to a second embodiment of the present invention is described. FIG. 4 is a longitudinal sectional view of composite filtration and demineralization apparatus 200 according to the second embodiment. The composite filtration and demineralization apparatus 200 has a filtration chamber that is different from the structure of filtration chamber 41 of composite filtration and demineralization apparatus 10 according to the first embodiment.

As shown in FIG. 4, composite filtration and demineralization apparatus 200 is provided with substantially cylindrical vessel 20 in the form of a body of revolution, substantially cylindrical hollow columnar body 240, and cover plate 30 that can be opened and closed and that is attached to vessel 20. Similar to the first embodiment, vessel 20 has columnar body 240 that is provided such that columnar body 240 separates the inside space of vessel 20 such that the separated spaces are arranged on the same plane. Inside space 241 of columnar body 240 functions as filtration chamber 141 in which filter elements 242 are loaded, and outside space 22 between columnar body 240 and vessel 20 functions as demineralization chamber 22 in which ion exchangers are charged. Line 32 is connected to cover plate 30 of vessel 20. Space 234 is provided above partition plate 244 and distribution plate 36 in vessel 20. Space 234 connects filtration chamber 241 with demineralization chamber 22 so as to allow water that passed through filtration chamber 241 to enter demineralization chamber 22.

Partition plate 244 is located on columnar body 240. Filtration chamber 241 is defined by columnar body 240, partition plate 244 and the bottom portion of vessel 20. Partition plate 244 includes outlets 243 that allow the water that was filtered by filtration filters 242 to enter space 234. Partition wall 249 is provided in the lower portion of filtration chamber 241, and water collecting chamber 270 is provided below partition wall 249. Water collecting chamber 270 is a space that is surrounded by partition wall 249, columnar body 240 and the bottom portion of vessel 20. Circulation port 245 is formed on partition wall 249. Circulation port 245 is connected to line 246 that is a flow path that connects demineralization chamber 241 with the outside of vessel 20. Dispersion plate 248 is provided above partition wall 249.

Filter elements 242 are connected to outlets 243 and fixed to partition plate 244 at one end thereof. Water collecting lines 247 are provided below filter elements 242. Water collecting lines 247 are inserted through the holes of dispersion plate 248 and partition wall 249 so that filter elements 242 are fixed to partition wall 249. In this way, a plurality of filter elements 242 is loaded in filtration chamber 241. Connecting tubes 260 for connecting space 234 with water collecting chamber 270 are provided in filtration chamber 241. Partition plate 244 is provided with outlets 243 of connecting tubes 260 on the side that faces space 234. Partition wall 249 is provided with inlets 262 of connecting tubes 260 on the side that faces water collecting chamber 270.

Line 250 for supplying air to filtration chamber 241 from the outside of vessel 20 is provided below dispersion plate 248. Line 252 is provided in the upper portion of filtration chamber 241 at a level that is below partition plate 244. Line 252 discharges the air in filtration chamber 241 to the outside of vessel 20. In composite filtration and demineralization apparatus 200, a means for backwashing the filter elements consists of dispersion plate 248 and lines 246, 250, 252.

Distribution plate 36 is located below partition plate 244 between vessel 20 and columnar body 240. Demineralization chamber 22 is defined by columnar body 240, vessel 20 and distribution plate 36. Circulation port 237 is provided in the bottom portion of vessel 20, the bottom portion being outside columnar body 240. Circulation port 237 is connected to line 238 that is a flow path that connects demineralization chamber 22 with the outside of vessel 20. Support 28 is provided in the lower portion of demineralization chamber 22. The ion exchangers are charged on support 28 so that layer 21 is formed. A means for backwashing the ion exchangers consists of space 234 and lines 29, 32, 238.

Filter element 242 may be a member that allows the filtered water to exit from the upper and lower ends thereof and may be of an external pressure filter type, such as a hollow fiber membrane module and a cylindrical pleated filter. In particular, the hollow fiber membrane module can be preferably used due to the fast filtering speed and high efficiency in removing suspended impurities. The type of the hollow fiber membrane module is not limited. In one example, a casing having through-holes or slits houses a bundle of hollow fiber membranes whose both ends in the longitudinal direction are bound together, wherein both ends of the casing are open and the end openings of the hollow fibers are located at both ends of the casing. In such a hollow fiber membrane module, one of the open ends is connected to outlets 243 as the upper end so that the module is fixed to partition plate 244. The other open end is connected to water collecting line 247 as the lower end. Similarly, when the cylindrical pleated filter is used, one of the open ends of the cylindrical pleated filter is connected to outlets 243 so that the filter is fixed to partition plate 44. The other open end is connected to water collecting line 247. In this way, filter elements 242 are loaded in columnar body 240, with one end of filter elements 242 being connected to outlets 243 and the other end being connected to partition wall 249 via water collecting line 247.

Filter element 242 is made of the same material as filter element 42. Dispersion plate 248 may be similar to dispersion plate 48.

Description will be made on the filtering treatment in composite filtration and demineralization apparatus 200. Water that is to be treated passes through line 246 and enters filtration chamber 241 via circulation port 245. After entering filtration chamber 241, the water that is to be treated passes through the holes of dispersion plate 248 and flows through filtration chamber 241. The water then penetrates through filter elements 242 and reaches the hollow holes of filter elements 242. A part of the filtered water that reached the hollow holes rises in the hollow holes and enters space 234 via outlets 243. Another part of the filtered water that reached the hollow hole descends in the hollow holes, passing through water collecting line 247 and reaching water collecting chamber 270. After reaching water collecting chamber 270, the filtered water passes through connecting tubes 260 via inlets 262 and enters space 234 via outlet 264. The water filtered by filter elements 241 then passes through space 234 and distribution plate 36, and passes through demineralization chamber 22 for demineralization. The filtered water is then fed to the point of use, not shown, via line 238. Alternatively, the water that was filtered in filtration chamber 241 is supplied to the point of use, not shown, via line 32, without being demineralized.

The backwash step for filter elements 242 is performed as follows. Air is supplied to filtration chamber 241 via line 250, and air in filtration chamber 241 is discharged to the outside of vessel 20 via line 252. Dispersion plate 248 generates bubbles in the air that was supplied. The air that includes the bubbles rise in filtration chamber 241. During the process, filter elements 242 are washed with air scrubbing that is caused by the air-lifted upward flow of the bubbles. After performing washing by air scrubbing for any specific duration of time, air supply to filtration chamber 241 is stopped. Air is then supplied to filtration chamber 241 via line 252 so that the water in filtration chamber 241 is discharged to line 246 via circulation port 245 (filter elements backwash step).

The present invention is not limited to the above-mentioned embodiments.

According to the first and second embodiments, the filtration chamber, in which the filter elements are loaded, is located in the columnar body, and the demineralization chamber, in which the ion exchangers are charged, is located between the columnar body and the vessel. However, it is also possible to arrange the demineralization chamber, in which the ion exchangers are charged, in the columnar body and to arrange the filtration chamber, in which the filter elements are charged, between the columnar body and the vessel. In this case, the partition plate having the circulation port extends circumferentially (annularly when vessel 20 and hollow columnar body 40 are both in circular shapes in section) between the other end 40b of hollow columnar body 40 and the inner surface of vessel 20. Generally, the flow between the filtration chamber and the demineralization camber can be well balanced when the cross section area of the filtration chamber is made smaller than that of the demineralization chamber. In addition, in order to remove or load the filter elements while the filter elements are fixed to the partition plate, the upper opening of the vessel must have an inner diameter that is no less than the diameter of the partition plate. This increases the material cost of the flange portion of the vessel that extends along the circumference of the upper opening. Thus, it is preferable to arrange the filtration chamber in the columnar body and to arrange the demineralization chamber between the columnar body and the vessel.

The first and second embodiments are provided with a double vessel structure which consists of the substantially cylindrical vessel and the substantially cylindrical columnar body. However, the configuration of the double vessel structure is not limited to these embodiments. The vessel and the columnar body both may be formed in a polygon shape. The vessel may be different from the columnar body in shape. In particular, the columnar body may be formed in various configurations because it is only subject to a differential pressure that is generated at the boundary of filter elements and the ion exchangers, and thus it does not need to be resistive to pressure as the vessel. Thus, the columnar body may be formed in a polygon shape, such as a square or a triangle. However, in order to be more resistive to pressure and to obtain more uniform flow velocity distribution of the water that is to be treated in the composite filtration and demineralization apparatus, the vessel and the columnar body are preferably formed in a cylindrical shape or in a polygonal shape that is similar to the cylindrical shape.

Although the first and second embodiments utilize the double vessel structure that consists of the vessel and the columnar body, the present invention is not limited to these embodiments. The vessel may be divided by a straight line or a curved line that connects any two points on the outer circumference of the vessel in the cross section. For example, in the case of a substantially cylindrical vessel, the vessel may be divided by a straight diametrical line in order to form the filtration chamber and the demineralization chamber. Alternatively, the vessel may be divided by a curved line in order to form the filtration chamber or the demineralization chamber such that either of the two chambers is formed in a crescent shape. Furthermore, for example, in the case of a polygonal columnar vessel, the vessel may be divided by a diagonal line in the cross section.

Distribution plate 36 is located below partition plate 44 according to the first embodiment, and is located below partition plate 244 according to the second embodiment. However, the position of the distribution plate is not limited to these embodiments. The distribution plate may be located at any position in the space that connects the filtration chamber with the demineralization chamber, as long as the filtered water that passed through the filtration chamber can be fed to the demineralization chamber, while being dispersed.

According to the first and second embodiments, the line for removing the ion exchangers is located in the lower portion of the ion exchangers layer in the demineralization chamber and above the support. However, the location of the line for removing the ion exchangers is not limited to these embodiments and the line may be located, for example, below the support.

According to the first and second embodiments, both the means for backwashing the filter elements and the means for backwashing the ion exchangers are provided. However, only one of the means may be provided, or both may be omitted.

According to the first and second embodiments, the means for circulating water is provided. However, the composite filtration and demineralization apparatus of the present invention is not limited to these embodiments. The means for circulating water may be omitted, although it is desirable to provide the means in order to reduce waste water.

The first and second embodiments include the space that connects the filtration chamber with the demineralization chamber in the double vessel structure in order to allow the water that passed through the filtration chamber to enter the demineralization chamber. However, the arrangement for connecting the filtration chamber with the demineralization chamber is not limited to these embodiments. A line for connecting the filtration chamber with the demineralization chamber may be arranged outside the double vessel structure. However, in order to reduce the cost of the apparatus and the size of the apparatus, the filtration chamber is preferably connected with the demineralization chamber inside the double vessel structure, as in the first and second embodiments.

The invention claimed is:

1. A filtration and demineralization system for filtering and demineralizing condensate from a thermal power plant or nuclear power plant, comprising:
   a cylindrical vessel coaxially arranged about a vertical axis, the vessel having an upper end that is closed and a lower end having an inlet port and an outlet port spaced radially outwardly from the inlet port;
   a cylindrical wall located within the vessel, the cylindrical wall having an open upper end that is spaced apart from the closed upper end of the vessel and a lower end that is sealed to the lower end of the vessel, wherein the cylindrical wall coaxially surrounds the inlet port of the vessel and is spaced radially inwardly from the outlet port of the vessel;
   a partition plate closing the upper open end of the cylindrical wall, wherein a space bound by the cylindrical wall, partition plate, and lower end of the vessel define a filtration chamber, and wherein the partition plate includes a plurality of filtrate outlet ports;
   a plurality of filter elements disposed within the filtration chamber, wherein a said filter element is connected to a respective said partition plate outlet port;
   an upper annular perforated distribution plate extending radially inwardly from an inner surface of the vessel to an outer surface of the cylindrical wall proximate the upper end of the cylindrical wall;
   a lower annular perforated support plate extending radially inwardly from an inner surface of the vessel to an outer surface of the cylindrical wall positioned below the upper annular perforated distribution plate and adjacent the outlet port of the vessel;
   wherein an annular space bound by the inner surface of the vessel wall, the outer surface of the cylindrical wall, the upper annular perforated distribution plate, and the lower annular perforated support plate define a demineralization chamber;
   ion exchange material disposed within the demineralization chamber for demineralizing said condensate;
   wherein a communication space bound by the closed upper end of the vessel, the partition plate, and the upper annular perforated distribution plate provides a flow path from the filtration chamber to the demineralization chamber; and
   whereby condensate flows upwardly into the filtration chamber through the vessel inlet port, flows through the filter elements in the filtration chamber to be filtered, flows upwardly through the filtration outlet ports in the partition plate and into the communication space, flows radially outwardly through the communication space and downwardly into the demineralization chamber through the upper annular perforated distribution plate, flows downwardly through the ion exchange material in the demineralization chamber to be demineralized, flows downwardly out of the demineralization chamber through the lower annular support plate, and flows downwardly out of the vessel through the vessel outlet port.

2. The filtration and demineralization system according to claim 1, further comprising;
   an outlet for discharging the water to an outside of the vessel, the water having been treated in the filtration chamber, and the outlet being located at a top of the vessel.

3. The filtration and demineralization system according to claim 1, further comprising;
   an inlet that allows the water to enter the demineralization chamber, the water being provided for treatment, and the inlet being located at a top of the vessel.

4. The condensate treatment filtration and demineralization system according to claim 1, wherein the vessel includes a cover plate that can be opened and closed in order to enable loading and removing of the filter element.

5. The filtration and demineralization system according to claim 1, further comprising;
   one or more charging port for charging the ion exchange material, the charging port being located above a layer of charged ion exchange material in the demineralization chamber, and
   one or more discharge port for discharging the ion exchangers, the discharging port being located in or below the layer of the charged ion exchangers.

6. The filtration and demineralization system according to claim 1, further comprising;

an air supply port for backwashing the ion exchange material, the air supply port being located below a layer of charged ion exchange material in the demineralization chamber, and an air discharge port for discharging air that was supplied, the air discharge port being located at a top of the vessel.

7. The filtration and demineralization system according to claim 1, further comprising;

an air supply port for air scrubbing the filter element, the air supply port being located below the filter element in the filtration chamber, and an air discharge port for discharging air that was supplied, the air discharge port being located in an upper portion of the filtration chamber.

8. The filtration and demineralization system according to claim 1, further comprising;

a line that connects the outlet with the inlet, the line forming a closed circulation path together with the filtration chamber and the demineralization chamber, and a pump that is provided on the line, the pump being configured to circulate water that exits from the outlet to the inlet.

9. The filtration and demineralization system according to claim 1, wherein the vessel is resistive to a system pressure of the filtration and demineralization system.

10. The filtration and demineralization system according to claim 1, comprising a water collecting chamber that collects a part of filtered water, a space that connects the filtration chamber with the demineralization chamber and a connecting tube that connects the water collecting chamber with the space.

* * * * *

UNITED STATES PATENT AND TRADEMARK OFFICE
CERTIFICATE OF CORRECTION

PATENT NO. : 8,658,036 B2  
APPLICATION NO. : 13/057270  
DATED : February 25, 2014  
INVENTOR(S) : Yoden et al.

Page 1 of 1

It is certified that error appears in the above-identified patent and that said Letters Patent is hereby corrected as shown below:

In the Specification

In column 2 at line 16 (approx.), Change "regenrerants" to --regenerants--.

In the Claims

In column 18 at line 53, In Claim 4, after "The" delete "condensate treatment".

Signed and Sealed this  
Seventh Day of October, 2014

Michelle K. Lee  
*Deputy Director of the United States Patent and Trademark Office*